United States Patent [19]
Bitonti

[11] 3,980,336
[45] Sept. 14, 1976

[54] SAFETY VALVE FOR TAILGATES OR THE LIKE

[75] Inventor: Paul A. Bitonti, Troy, Mich.

[73] Assignee: Ross Operating Valve Company, Detroit, Mich.

[22] Filed: June 26, 1974

[21] Appl. No.: 483,309

[52] U.S. Cl. .............................. 298/23 M; 91/356; 91/426; 137/624.27; 137/625.69
[51] Int. Cl.² ..................... B60P 1/04; F15B 11/15; F15B 13/04
[58] Field of Search ............ 298/23 M; 91/426, 356; 137/624.27, 625.69

[56] References Cited
UNITED STATES PATENTS

| | | | |
|---|---|---|---|
| 2,322,611 | 6/1943 | Winkler | 91/426 X |
| 2,598,891 | 6/1952 | Cooke | 137/624.27 X |
| 2,864,402 | 12/1958 | Presnell | 137/624.27 |
| 2,868,583 | 1/1959 | Harbers et al. | 298/23 M |
| 3,139,908 | 7/1964 | Strader | 137/625.69 X |
| 3,354,911 | 11/1967 | Fall | 137/625.69 |
| 3,404,918 | 10/1968 | Lackey | 298/23 M |
| 3,511,276 | 5/1970 | Jessen et al. | 137/624.27 |
| 3,618,984 | 11/1971 | Cook et al. | 137/624.27 |
| 3,762,443 | 5/1973 | Sorenson | 251/324 |

*Primary Examiner*—Irwin C. Cohen
*Attorney, Agent, or Firm*—Harness, Dickey & Pierce

[57] ABSTRACT

A four-way spool valve controls a double acting fluid motor for locking or unlocking a part such as a tailgate. The valve is spring-urged to a locking position and hand-operable to its unlocking position. A position at the end of the valve is pressurized when in the unlocking position to counteract the spring. This piston monitors supply pressure so that the valve will be automatically shifted to its locking position when pressure drops. This will insure a locked position of the part when pressure is reapplied.

4 Claims, 2 Drawing Figures

SAFETY VALVE FOR TAILGATES OR THE LIKE

BACKGROUND OF THE INVENTION

1. Field of the Invention

The invention relates to controls for fluid-operated motors used to the unlocking and locking of parts such as dump trailer tailgates. It is important to prevent inadvertent unlocking of such parts due to temporary reduction or loss of pressure, followed by reapplication of full pressure.

2. Description of the Prior Art

It is known to have safety valve means for systems of this type which operate on the principle of manual movement to one position, the valve means being spring-urged to a safety position with piston means holding the valve means against the spring so that low pressure is monitored for safety purposes. However, such prior art constructions have several drawbacks in terms of lack of simplicity and in ability to control double acting fluid motors.

BRIEF SUMMARY OF THE INVENTION

It is an object of the present invention to provide a novel and improved safety valve for tailgates or the like, which is of relatively simple four-way spool valve construction, can be operated quickly and effectively to control a double acting fluid motor and will monitor supply pressure so as to automatically shift the valve to a safety or locking condition should supply pressure be depleted below a certain level, insuring locking of the part when pressure is reapplied.

Briefly, the illustrated embodiment of the invention is a safety valve for controlling a double acting fluid motor shiftable between first and second positions and shifting a tailgate lock between locking and unlocking positions, said valve comprising a housing, a spool valve slidably mounted in said housing, a central chamber in said housing, a supply port in said housing leading to said central chamber, a pair of working chambers on opposite sides of said central chamber, working ports in said housing leading from said working chambers, connections between said working ports and opposite sides of said fluid motor, a pair of exhaust chambers outwardly of said working chambers, exhaust ports in said housing leading from said exhaust chambers, said valve spool being movable between a first position in which said supply chamber is connected to a first working chamber and the second working chamber is connected to its adjacent exhaust chamber, whereby said fluid motor will be shifted to its first position, and a second position in which said supply chamber is connected to the second working chamber and the first working chamber connected to its adjacent exhaust chamber, whereby the motor will be shifted to its second position, a handle on said spool outwardly of said housing for moving said spool between its positions, a spring between said housing and a portion of said spool and urging the spool toward its first position, a piston at the end of said spool opposite said handle, a piston chamber formed between said piston and the adjacent end of said housing, and a fluid passage leading from said second working chamber to said piston chamber, the relative dimensions of said spring and piston being such that said piston will hold said spool in its second position against the urging of said spring as long as supply fluid pressure is above a predetermined level, whereby dropping of supply fluid pressure below said level will cause said spring to shift the spool to its first position.

DESCRIPTION OF THE PREFERRED EMBODIMENT

Figure 1:
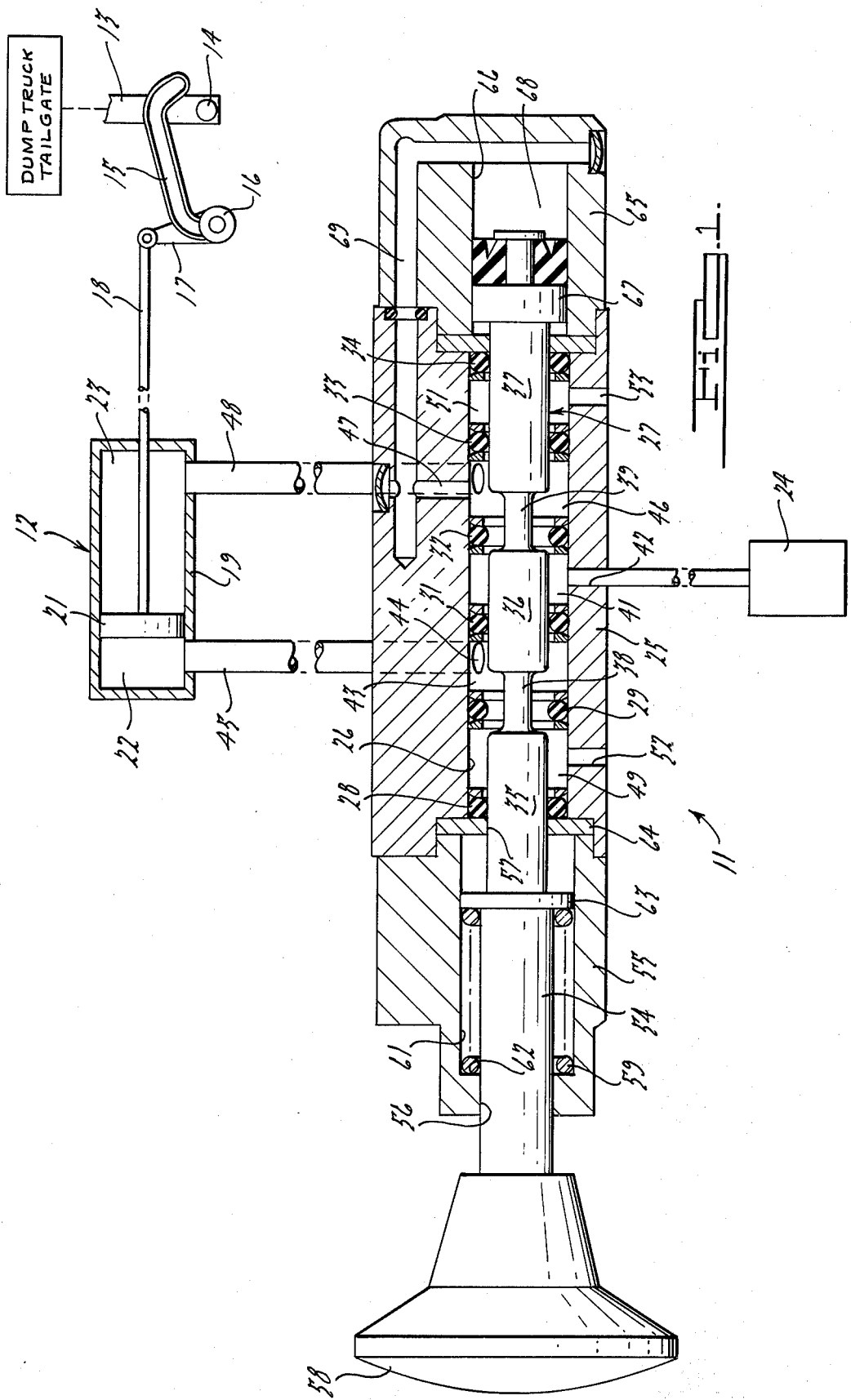
FIG. 1 is a partially schematic cross-sectional view of the safety valve of this invention connected to a double acting fluid motor for locking and unlocking a tailgate or the like, the valve being shown in its unlocking position.

The safety valve is generally indicated at 11 and is intended to control a double acting fluid motor generally indicated at 12. This motor may for example comprise a lock mechanism for a tailgate 13 on a dump trailer. The tailgate is shown as having a pin 14 at its lower end retainable by a hook 15 which constitutes a lock. The lock is mounted on a rockable shaft 16 carrying a crank 17 connected to motor 12 by a link 18. The motor comprises a cylinder 19 shiftable between an unlocking position shown in FIG. 1 and a locking position shown in FIG. 2. The cylinder has a piston 21 forming two chambers 22 and 23. When chamber 22 is pressurized and chamber 23 exhausted, hook 15 will be moved to its locking position, whereas pressurization of chamber 23 and depressurization of chamber 22 will shift the hook to its unlocking position (FIG. 1).

Safety valve 11 is intended to prevent the inadvertent shifting of piston 21 to its unlocking position when the fluid pressure from supply source 24 is temporarily reduced or removed, and later reapplied. With a control valve of the conventional type (not shown) which could be left in either its locking or unlocking position, it was possible that the valve could be shifted to its unlocking position while pressure was depleted, and the system then repressurized by a person unaware of the control valve setting. The pressure would inadvertently unlock the tailgate.

Safety valve 11 comprises an elongated housing 25 having a bore 26 within which is slidably mounted a spool valve member generally indicated at 27. A plurality of seals 28, 29, 31, 32, 33, and 34 are mounted at spaced intervals within bore 26. Spool 27 has lands 35, 36, and 37 separated by portions 38 and 39 of reduced diameter. Portion 36 of the spool is slidable within supply chamber 41 formed by seals 31 and 32. This chamber has a supply port 42 leading from pressure source 24. Seals 29 and 31 form a first working chamber 43 on one side of chamber 41, having a working port 44 connected by a conduit 45 to chamber 22 of motor 12. Seals 32 and 33 form a second working chamber 46 on the other side of chamber 41, having a port 47 connected by a line 48 to chamber 23 of motor 12.

Figure 2:
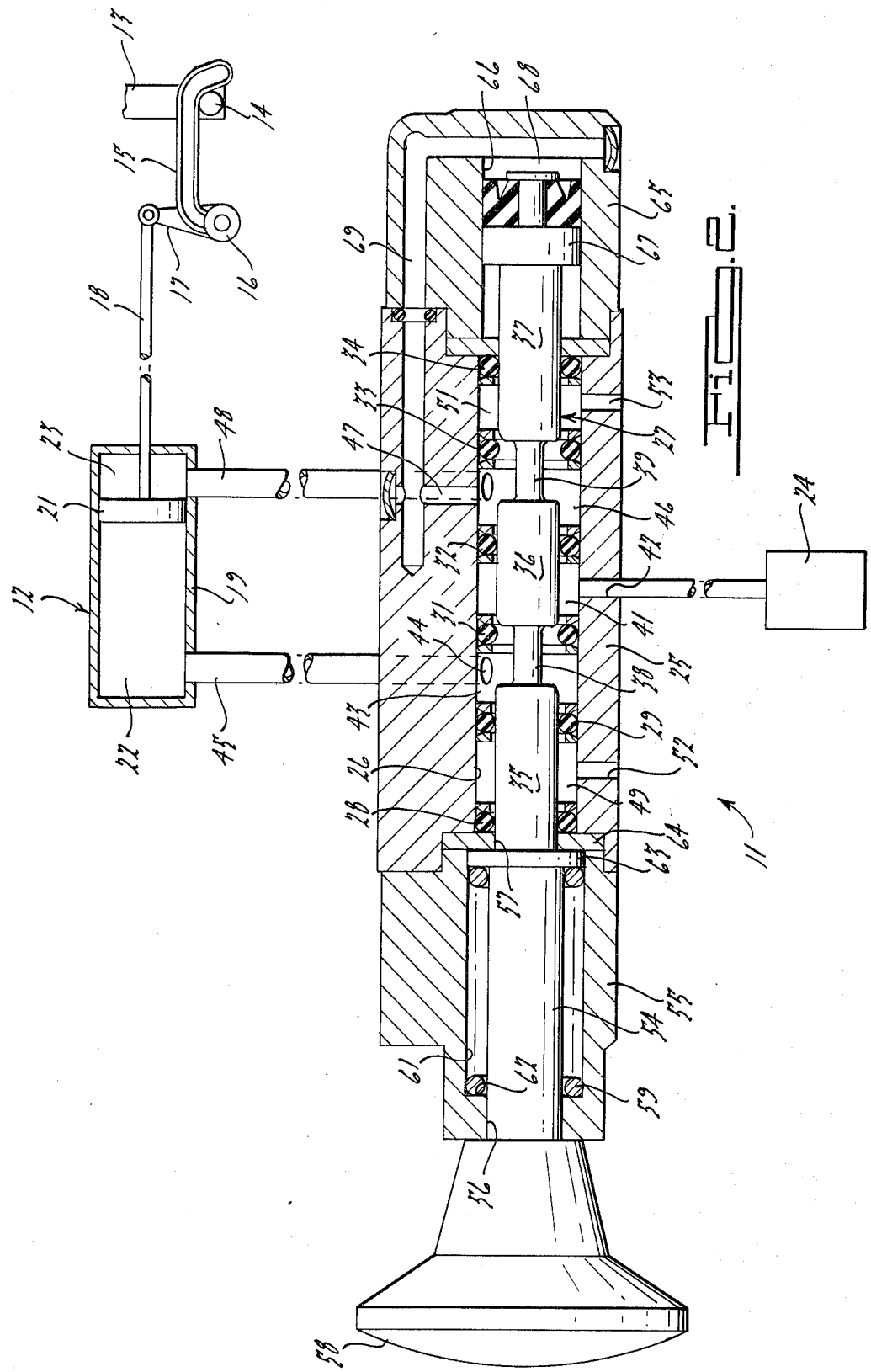
FIG. 2 is a view similar to FIG. 1 but showing the valve in its locking position.

Seals 28 and 29 form a first exhaust chamber 49 outwardly of chamber 43 and seals 33 and 34 form an exhaust chamber 51 outwardly of chamber 46. With spool 27 in its left hand or unlocking position as shown in FIG. 1, chamber 41 is connected to chamber 46, pressurizing motor chamber 23, while motor chamber 22 is exhausted through chambers 43 and 49 and exhaust port 52. With the valve in its right hand position as shown in FIG. 2, the pressurization and exhaustion of the two motor chambers is reversed to shift the motor to its locking position, chamber 23 being exhausted through chambers 46 and 51 and exhaust port 53.

An extension 54 on one end of spool 27 passes through a housing portion 55, being guided at 56 and 57. A handle 58 is carried by the outer end of extension 54, outwardly of housing 25. A helical coil compression spring 59 is disposed within an enlarged bore 61 within housing portion 55, one end of this spring engaging a shoulder 62 of the housing and the other end a shoulder 63 carried by spool portion 54. Spring 59 urges the spool to its right hand or locking position as shown in FIG. 2, shifting hook 15 to its locking position. This position of the spool is limited by engagement of shoulder 63 with a shoulder 64 in the housing.

Handle 58 may be grasped to pull spool 27 to the left against the urging of spring 59, moving the spool to its unlocking position shown in FIG. 1. This will move hook 15 to its unlocking position.

Housing 25 has a portion 65 at the end remote from portion 55, this housing portion having a bore 66 with a diameter greater than that of spool 27. A piston 67 is slidably mounted in this bore and engages or is attached to spool 27. A chamber 68 is formed by piston 67. A passageway 69 leads from working chamber 46 through the housing to chamber 68. The relative dimensions of the parts are such that after spool 27 is moved by handle 58 to its FIG. 1 position, the force on piston 67 exerted by the pressurized fluid will hold the valve in this position against the urging of spring 59, as long as the unit pressure is above a predetermined amount.

In use, pressure source 24 will normally deliver full line pressure to supply port 42. When it is desired to unlock the tailgate, the operator will grasp and pull handle 58, shifting the valve to its FIG. 1 position. This will shift hook 15 to its unlocked position, and pressurize chamber 68 so that the valve will be so held as long as pressure is maintained at supply port 42. To return hook 15 to its locked position while supply pressure is available, handle 58 will be forced against the pressure on piston 67 until land 37 passes seal 33, dumping compressed fluid from motor chamber 23 as well as piston chamber 68, and pressurizing motor chamber 22.

Should the supply pressure be depleted or cut off altogether, for example, when a dump trailer is parked for the night with tailgate 13 locked by hook 15, pressure will be unavailable for piston chamber 68, allowing spring 59 to hold spool 27 to its locking position as shown in FIG. 2. With the present invention, it will be impossible for anyone to accidentally or deliberately shift and leave valve 11 in its unlocking position. Should a person, for example, pull on handle 58 and then release the handle, spring 59 will immediately return spool 27 to its right hand or locking position since there is no pressure in piston chamber 68.

Thus, when fluid pressure source 24 is reactivated, for example by the driver starting the dump trailer in the morning, there is no danger that tailgate 13 can be unlocked. Instead, pressure will be delivered to motor chamber 22, holding hook 15 in its locking position. No pressure will be delivered to piston chamber 68 since it is connected to an exhaust port 53. In order to unlock the tailgate, the operator must pull handle 58 after the pressure source 24 has been reactivated.

I claim:
1. In combination with a double acting fluid motor shiftable between first and second positions, a two position safety control valve comprising a housing having a bore with spaced seals of uniform diameter, a spool valve slidably mounted in the seals of said housing bore, a central chamber in said housing, a supply port in said housing leading to said central chamber, a pair of working chambers on opposite sides of said central chamber, two of said seals separating said central chamber from said working chambers, working ports in said housing leading from said working chambers, connections between said working ports and opposite sides of said fluid motor, a pair of exhaust chambers outwardly of said working chambers, two of said seals separating said working chambers from said exhaust chambers, exhaust ports in said housing leading from said exhaust chambers, said valve spool being movable between a first position in which said supply chamber is connected to a first working chamber and the second working chamber is connected to its adjacent exhaust chamber, whereby said fluid motor will be shifted to its first position, and a second position in which said supply chamber is connected to the second working chamber and the first working chamber connected to its adjacent exhaust chamber, whereby the motor will be shifted to its second position, a handle on one end of said spool outwardly of said housing for moving said spool between its positions, a spring between said housing and a portion of said spool, said spring engaging a portion of said spool which is unobstructed by said housing in all positions of said spool whereby the spring constantly urges the spool toward its first position regardless of the position of said spool, a pressure responsive piston having a circular face area fixed to said spool at the end opposite said handle, a piston chamber formed between said piston circular face area and said housing and a fluid passage leading from said second working chamber to said piston chamber, said fluid passage being open regardless of whether said valve spool is in either of its positions, the relative dimensions of said spring and piston face area being such that said piston will hold said spool in its second position against the urging of said spring as long as supply fluid pressure is above a predetermined level, whereby dropping of supply fluid pressure below said level will cause said spring to shift the spool to its first position.

2. The combination according to claim 1, said spring being a helical coil compression spring surrounding a portion of said spool between said handle and first exhaust chamber.

3. The combination according to claim 1, said fluid passage between said second working chamber and piston chamber being formed within said housing.

4. The combination according to claim 1, further provided with a dump truck tailgate, a lock for said tailgate movable between a locking position preventing opening of the tailgate and an unlocking position permitting opening, and a connection between said lock and said fluid motor, the fluid motor when in its first position locking said tailgate and when in its second position unlocking said tailgate.

* * * * *